No. 747,690. PATENTED DEC. 22, 1903.
W. C. FORBES.
DISTANCE AND COURSE RECORDER FOR SHIPS.
APPLICATION FILED NOV. 24, 1902.
NO MODEL.
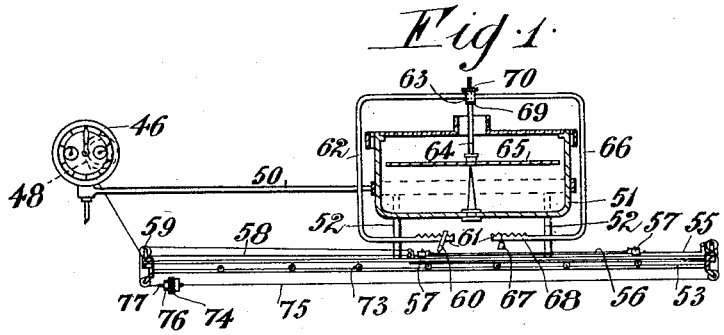
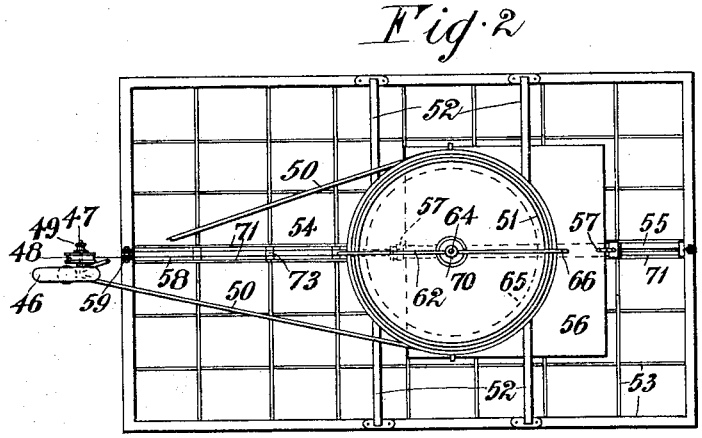
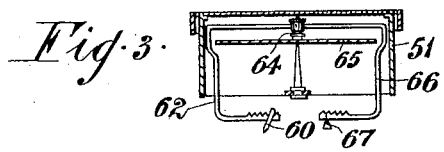
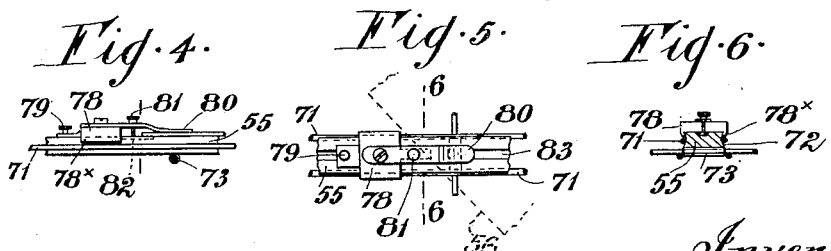

No. 747,690. Patented December 22, 1903.

UNITED STATES PATENT OFFICE.

WILLIAM CHALMERS FORBES, OF ELSTERNWICK, VICTORIA, AUSTRALIA.

DISTANCE AND COURSE RECORDER FOR SHIPS.

SPECIFICATION forming part of Letters Patent No. 747,690, dated December 22, 1903.

Application filed November 24, 1902. Serial No. 132,695. (No model.)

*To all whom it may concern:*

Be it known that I, WILLIAM CHALMERS FORBES, master mariner, a subject of the King of Great Britain, residing at Brickwood street, Elsternwick, in the State of Victoria and Commonwealth of Australia, have invented an Improved Distance and Course Recorder for Ships, of which the following is a specification.

This invention relates to improvements in distance and course recorders for ships, which are used in conjunction with bridge-logs or any mechanism controlled by the travel of a ship; and the object is to provide a reliable apparatus which will record not only the distance traveled by the ship toward its destination, but the actual course of same on a scaled chart, so that inaccuracies in steering may be readily checked and rectified. The charts, moreover, are reliable records of the efficiency of the master in charge.

According to this invention, the meter which registers the distance traveled by the ship is attached to the basin of a compass, under which is situated a chart adapted to be drawn rearwardly in a direct line by the mechanism of said meter, so that a recording pen or pencil mounted on the end of an arm extending from the compass-card will trace the actual distance and course on the chart.

Referring now to the accompanying drawings, Figure 1 is a vertical section; Fig. 2, a plan, of my improved recorder. Fig. 3 is a vertical section illustrating a modification of a certain part of Fig. 1, which will be hereinafter referred to. Figs. 4 and 5 are, respectively, an enlarged side elevation and plan of the grips for securing the chart in position. Fig. 6 is a transverse section on line 6 6 of Fig. 5.

The meter 46 (shown in Figs. 1 and 2) is of the usual type and receives its rotary motion by the inrush of the water acting on a rotator-log or turbine as the vessel moves forwardly. From said meter a spindle 47 projects laterally from one of the gear-wheels of its mechanism, and on it is a winding-drum 48, adjustably secured thereto by a thumbscrew 49, so that it may be readily removed. The diameter of the drum varies according to the scale of the chart. This meter is mounted on brackets 50 50, projecting from the basin 51 of the compass, which is swung in any suitable binnacle, (not shown in the drawings,) and from said basin the arms 52 depend to support a lightly-framed table 53, in the center of which is a guideway 54, in a true fore-and-aft line with the keel of the ship, wherein a carrier 55 travels, which is adapted to hold the chart 56 in any position by adjustable grips 57. A cord 58 is attached to the rear end of said carrier and passing under a pulley 59 on the rear end of the table is secured to the winding-drum 48, which draws the chart slowly toward it according to the rate at which the ship is traveling, as ascertained by the mechanism before referred to.

The course made by the ship is traced on the chart 56 by a recording pen or pencil 60, adjustably hung between teeth 61 on the lower end of a bent arm 62, extending from a boss 63 on a standard 64, rising vertically from the compass-card 65, said arm being bent around abaft and under the basin of the compass to the position shown in Fig. 1, so that said pen is in contact with the chart. In order to balance the compass, another similar arm 66 is attached to the boss 63, which arm is provided with an adjustable weight 67, hung between teeth 68 on the lower extremity. The boss carrying the arms rests on a shoulder 69 on the screw-threaded end of the standard 64 and is set in the correct position by a setscrew 70.

Referring particularly to Figs. 1 and 2, and the details of the carrier-grips, as shown in Figs. 4, 5, and 6, it will be seen that the guideway of the carrier consists of two side guide-rods 71, mounted on the table and engaging corresponding longitudinal recesses 72 in each side of the carrier, while rollers 73 or other bearings are provided on the table to prevent frictional resistance. On the other hand, it is necessary to provide means for preventing the racing of the carrier, and this is effected by providing a weight 74, attached by a cord 75, passing under the table and over pulleys on said table, to the front and rear ends of said carrier. This weight, which counterbalances the weight of the carrier and chart, may be adjusted by unscrewing the nut 76 on the threaded stem 77 and removing or increasing the number of slotted disks that form the weight.

The adjustable grips 57 on each end of the carrier, Figs. 4, 5, and 6, which grip the chart, consist of a sliding block 78, having depending side flanges 78× in engagement with the sloping recess 72 in the sides of the carrier, said block being clamped in position by a thumb-screw 79. On the top of the block is mounted a flat spring 80, curved downwardly, and adapted to grip the chart against the carrier when screwed down by the thumb-screw 81. This thumb-screw screws into a lug 82, projecting from said block, which slides in a groove 83 in the upper surface of the carrier. By the construction of these adjustable spring-grips the chart may be secured in any position on the carrier.

As an illustration of the working of this invention, supposing it is desired to know the actual distance and course traveled by the ship between an imaginary point A and another B, the chart is first clamped in position on the carrier, so that the points A and B are in line with the center of it—i. e., in line with the keel of the vessel—and the point A immediately under the point of the recording-pen, the arm of which is also placed in line with said carrier. Then the winding-drum, which is attached by the cord to the front end of carrier, is secured to the spindle of the meter mechanism, so that when this latter is set in motion by the travel of the ship it draws slowly toward it the chart, which is in touch with the recording-pen on the compass-card, so that it traces the actual course of the ship to scale on said chart.

It is not essential that the meter shall show on its face the distance traveled, as this is shown on the chart. The mechanism of the meter is only the reducing-gear employed between the rotator-leg or turbine and the chart.

Instead of the arm carrying the recording-pen and its counterbalance-arm extending over and under the basin of the compass they may be placed, as shown in Fig. 3, within the basin and passing on the outside of the compass-card through the open bottom, a base being left to support the needle.

Having now particularly described and ascertained the nature of my said invention and in what manner the same is to be performed, I declare that what I claim is—

1. In a distance and course recorder for ships, the combination with a meter, and a winding-drum connected therewith, of a chart, a carrier, a guideway therefor, and grips combined with the carrier to engage the chart.

2. In a distance and course recorder for ships, a compass-basin, a compass-card, an arm supported by the said card and bent around abaft and under the basin, a chart, and a recording implement carried by the arm and traversing the chart.

3. In a distance and course recorder for ships, a compass-basin, a compass-card, a counterbalanced arm supported by the said card and bent around abaft and under the basin, a chart, and a recording implement carried by the arm and traversing the chart.

4. In a distance and course recorder for ships, a compass-basin, a compass-card, a toothed counterbalanced arm supported by the said card and bent around abaft and under the basin, a chart, and a recording implement carried by the arm and traversing the chart.

5. In a distance and course recorder for ships, a compass-basin, a compass-card carrying a standard, a counterbalanced arm on the standard, a chart, and a recording implement adjustably mounted on the arm.

6. In a distance and course recorder for ships, a compass-basin, a compass-card, a counterbalanced arm supported thereby and bent around abaft the compass-card, and a recording implement adjustably mounted on the lower end of the said arm.

7. In a distance and course recorder for ships, the combination with a compass, and a meter, of a chart disposed beneath the compass and operatively connected with the meter, and a recording implement supported by a part of the compass and adapted to contact with the chart.

8. In a distance and course recorder for ships, the combination with a compass and a chart disposed beneath the same, of a meter, a connection between the chart and a driven part of the meter, and a recording implement supported from a part of the compass and disposed to impinge the chart.

9. In a distance and course recorder for ships, the combination with a compass and a chart disposed beneath the same, of a meter, a connection between the chart and the meter, and an adjustable recording implement supported from a part of the compass and disposed to impinge the chart.

10. In a distance and course recorder for ships, a compass-basin, a table supported therefrom, guides carried by the table, a carrier movable in the guides, a chart supported by the table, means for holding the chart on the carrier, a recording device supported by the compass, a meter, and means for operatively connecting the carrier and a movable part of the meter.

In testimony whereof I have hereunto set my hand in presence of two subscribing witnesses.

WILLIAM CHALMERS FORBES.

Witnesses:
EDWARD WATERS,
EDWARD WATERS, Jr.